United States Statutory Invention Registration [19]

[11] Reg. Number: H346

Epstein et al. [43] Published: Oct. 6, 1987

[54] PROCESS FOR MAKING COMPOUNDS POSSESSING ANTICHOLINESTERASE ACTIVITY

[75] Inventors: Joseph Epstein, Baltimore; Harry O. Michel, Towson; Robert E. Plapinger, Baltimore; Joseph H. Fleisher, Baltimore; John J. Callahan, Baltimore; Bernard J. Jandorf, Baltimore, all of Md.

[73] Assignee: The United States of America as represented by the Secretary of the Army, Washington, D.C.

[21] Appl. No.: 798,268

[22] Filed: Feb. 5, 1969

[51] Int. Cl.[4] ..... C07F 9/02
[52] U.S. Cl. ..... 558/105
[58] Field of Search ..... 260/945, 606 SP; 558/105, 106, 146, 166

[56] References Cited

U.S. PATENT DOCUMENTS

| | | | |
|---|---|---|---|
| 2,922,739 | 1/1960 | Snyder | 260/945 X |
| 3,014,943 | 12/1961 | Schegk et al. | 260/945 |
| 3,223,754 | 12/1965 | Cölln et al. | 260/948 |
| 3,480,698 | 11/1969 | Cyba | 260/945 |
| 3,501,557 | 3/1970 | Brois | 558/105 |
| 3,781,387 | 12/1973 | Ford-Moore et al. | 558/106 |
| 3,903,210 | 9/1975 | Epstein et al. | 558/105 |

OTHER PUBLICATIONS

Tammelin, "*Acta Chemica Scandinavica*", *11*, 1340–1349 (1957).

Hoffmann et al., *J. Am. Chem. Soc.*, *80*, 3945–3948, (1958).

Calderbank et al., *J. Chem. Soc.*, 637–642 (Feb. 1960).

*Primary Examiner*—John F. Terapane
*Assistant Examiner*—Mary Lou Mallon
*Attorney, Agent, or Firm*—Anthony T. Lane; Harold H. Card, Jr.; Edward F. Costigan

[57] ABSTRACT

The compounds of S-(2-dialkylaminoalkyl) alkyl phosphonothioic acids and method of preparing said compounds possessing anticholinesterase activity comprising an aqueous solution which comprises dialkylaminoalkyl chloride salts which are converted to their corresponding dialkylmonoalkyl ammonium ions and alkylphosphonothioic acids forming a reaction mixture. The latter mixture is placed on a cation exchange resin with subsequent addition of water as an eluting agent giving rise to fractions containing the desired compounds.

7 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR MAKING COMPOUNDS POSSESSING ANTICHOLINESTERASE ACTIVITY

DEDICATORY CLAUSE

The invention described herein may be manufactured, used, and licensed by or for the Government for governmental purposes without the payment to us of any royalty thereon.

This invention is directed to novel chemical compounds exhibiting antiocholinesterase activity.

The object of this invention is to prepare chemical agents which are resistant to known therapeutic agents.

The function of anticholinesterase is to prevent the action of cholinesterase which results in the prevention of the stimuli from acetylcholine upon the nervous system.

The prior art compound S-(diisopropylaminoethyl) ethoxy methylphosphonothioate was a result of classified research and is employed in this disclosure as the known closely related compound compared with the chemical compounds of this invention. The said prior art compound and its method of production does not form part of the inventive portion of this invention.

The method of preparing the aforesaid prior compound comprises 0.04 moles of an aqueous solution containing potassium phosphonothiolate was added to 50 ml of a 0.4M sodium hydroxide solution. Then 200 ml of a solution containing 0.02 moles $\beta$-chloroethyldiisopropylamine hydrochloride was added with vigorous stirring and permitted to stand for about five minutes and the pH was between 10.0 to 10.5. Then, 50 ml of 0.04M acetic acid was added with vigorous stirring and the pH dropped to 5.15. Aliquots were extracted and tested for constant anticholinesterase which was achieved when the approximate pH 8.8 of the solution was reached. The solution was adjusted to pH 10.5 and extracted with ether. The extracts were combined, dried over sodium sulfate, distilled and recovering the desired compound.

The structure of the classified research compound is:

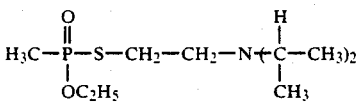

Based upon previously published information about the relationship between anticholinesterase activity and structure by O'Brien, Richard D., *Toxic Phosphorus Esters,* Academic Press, New York and London, 1960, pp. 92 et seq., set forth certain chemical configurational requirements, that is, an ester of the general formula: R or RO(R'O) P(:O)X wherein: R and R', an alkyl group; X, an electronegative group, such as F,

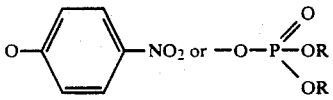

Insertion of a nucleophilic group such as an anion into the molecule depresses anticholinesterase activity. Thus contrary to the well established scientific data, we found that some phosphorus compounds with nucleophlic groups, e.g., free acidic group, do not depress anticholinesterase activity.

Under certain circumstances it is prudent to have available various chemical agents which are resistant to known therapeutic agents. Resulting from our investigations with other agents useful under hostile environments there emerged the indication that phosphorus compounds containing certain dialkylaminoethylthiol groups would give rise to a group of compounds containing the desired properties.

The novel compounds of this invention are prepared according to the following method. An aqueous solution comprising dialkylaminoethylchloride salt, compound 1, in water without pH adjustment or adjusting to pH 9–11 which results in a more rapid conversion as compared with the absence of the pH adjustment to the corresponding dialkylethylammonium ion, compound 2, which reacts with methylphosphonothioic acid, compound 3, forming a reaction mixture which was adjusted to pH 5 to 7 and the reaction proceeded to form the desired end-product in situ. The reaction mixture was placed upon cation exchange resin, Dowex 50–x8, in hydrogen form utilizing hydrochloric acid, eluted with water, the fractions containing the anticholinesterase activity were combined, and the water removed leaving a residue of the desired compounds i.e., S-(2-dialkylaminoalkyl)alkyl phosphonothioic acid, compound 4. The abovementioned exchange resin is prepared by the sulfonation of a resin copolymer containing styrene and divinylbenzene. The amount of divinylbenzene determines the crosslinkage of the ion-exchange resin and the resin of 8% crosslinkage is indicated by "X8". The chemical sequence may be summarized as follows:

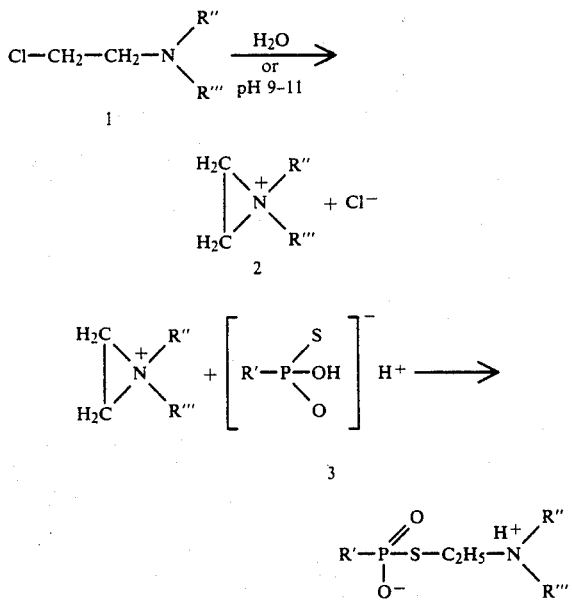

wherein R' is a lower alkyl radical up to four carbon atoms R'' and R''' are the same or different and each is a lower alkyl radical up to three carbon atoms.

The preparation of alkylphosphonothioic dichlorides, Example 1, were prepared according to the method described by Hoffman et al, *J. Am. Chem. Soc.*, 80, 3945 (1958).

Example 1

Preparation of Alkylphosphonothioic Dichlorides (a) In a nitrogen atmosphere at room temperature a suspension comprising 0.24 moles anhydrous aluminum chloride, 4.0 moles methylphosphonous dichloride and 4.0 g sulfur flowers was maintained between 35°-45° C. The reaction mixture, clear yellowish-brown, subsequently was distilled giving methylphosphonothioic dichloride.

(b) The procedure according to (a) supra, was repeated with the exception of substituting alkylphosphonous dichloride member selected from the group consisting of ethylphosphonous, propylphosphonous, isopropylphosphonous, and butylphosphonous dichlorides for the methylphosphonous dichloride and producing the corresponding alkylphosphonothioic dichloride members selected from the group consisting of ethylphosphonothioic, propylphosphonothioic, isopropylphosphonothioic and butylphosphonothioic dichlorides.

Example 2

Preparation of Alkylphosphonothioic Acids (a) A solution comprising about 30 g methylphosphonothioic dichloride, Example 1(a), mixed with about 200 ml of 10% sodium hydroxide, while being cooled and stirred was acidified with hydrochloric acid, saturated with sodium chloride, and extracted with a solvent such as diethylether. The ether extract was dried over magnesium sulfate and the ether was removed by vacuum distillation resulting in the methylphosphonothioic acid as a colorless oil.

(b) The procedure under (a) supra, was followed, with the substitution of the alkylphosphonothioic dichloride members selected from the group consisting of ethylphosphonothioic, propylphosphonothioic, isopropylphosphonothioic and butylphosphonothioic dichloride, Example 1(b), thus giving the corresponding alkylphosphonothioic acid members selected from the group consisting of ethylphosphonothioic, propylphosphonothioic, isopropylphosphonothioic and butylphosphonothioic acids.

Example 3

(a) An aqueous alkaline solution comprising the dropwise addition of concentrated sodium or potassium hydroxide solution to a 100 ml aqueous medium containing about 9.5 g (0.047 mole) of diisopropylaminoethylchloride hydrochloride until the aqueous solution maintained a constant pH value of about 10 for at least 10 minutes indicating the substantial conversion of said hydrochloride to the corresponding diisopropylethylammonium ion. The said alkaline solution was added to a solution comprising 20 ml of an aqueous solution containing 5.1 g (0.040 mole) methylphosphonothioic acid, Example 2(a), with the subsequent addition of aqueous alkaline solution resulting in the reaction mixture with a pH of 6.4. The latter reaction mixture was permitted to stand without further pH adjustment, and maximum activity was reached after about 40 minutes of the said reaction mixture pH adjustment to 6.4. The reaction mixture was permitted to stand for an additional 1½ hours after the initial said 40 minutes time period and subsequent pH adjustment to 5.0 with hydrochloric acid, then poured through a column containing about 300 g of a cation exchange resin, 300 mesh, Dowex 50-x8, in hydrogen form, and then eluted with distilled water. The eluate comprising the anticholinesterase activity first appeared at about 1,100 ml fraction and continued to be eluded from the column for the following 3,500 ml. The anticholinesterase activity was determined using horse-serum esterase however any other appropriate esterase can be utilized. The fractions containing the activity were combined with subsequent water removal, and the residue S-(2-diisopropylaminoethyl)methyl phosphonothioic acid was dissolved in chloroform and recrystallized several times from a chloroform-ether solution. The ether may be diethylether.

Anal. Calcd. for $C_9H_{22}O_2NPS$; C, 45.2; H, 9.2 Found; C, 45.2; H, 9.2

The infrared spectrum of the solid S-(2-diisopropylaminoethyl) methylphosphonothioic acid has a maximum absorption due the P–O⁻ configuration occurs at 9.55μ; the maximum absorption in chloroform due to P–O⁻ configuration in the said phosphonothioic acid is shifted to longer wave length of 9.8μ.

The isoelectric point of the S-(2-diisopropylaminoethyl) methylphosphonothioic acid is about pH 5.0, and m.p. 138°-140° C.

(b) The procedure under (a) supra, was followed with the substitution of alkylphosphonothioic acid member selected from the group consisting of ethylphosphonothioic, propylphosphonothioic, isopropylphosphonothioic and butylphosphonothioic acids, Example 2(b), for the previously used methylphosphonothioic acid and eluding with water from the said ion exchange resin the corresponding S-(dialkylaminoalkyl) alkyl phosphonothioic acid member selected from the group consisting of S-(2-diisopropylaminoethyl) ethylphosphonothioic, S-(2-diisopropylaminoethyl) propyl phosphonothioic, S-(2-diisopropylaminoethyl)isopropyl phosphonothioic, and S-(2-diisopropylaminoethyl) butyl phosphonothioic acids.

Example 4

(a) In accordance with the procedure of Example 3(a), with the exception of substituting for the diisopropylaminoethylchloride hydrochloride the dialkylaminoalkylchloride hydrochloride member selected from the group consisting of dimethylaminoethylchloride, methylethylaminoethylchloride, methylisopropylaminoethylchloride, diethylaminoethylchloride, and ethylisopropylaminoethylchloride hydrochlorides forming the corresponding dialkylethylammonium ion, Compound 2, supra, which is reacted with the methylphosphonothioic acid and subsequently collecting the eluate comprising the anticholinesterase active fractions of S-(2-dialkylaminoalkyl) alkyl phosphonothioic acids in accordance with the compounds of this invention as illustrated in the general formula set forth below wherein R′ is methyl.

(b) In accordance with the procedure of Example 3(a), supra, with the exception of substituting for the diisopropylaminoethylchloride hydrochloride the dialkylaminoalkylchloride hydrochloride member selected from the group consisting of as set forth in Example 4(a), supra, forming the corresponding dialkylethylammonium ion, Compound 2, supra, and substituting for the methylphosphonothioic acid, Example 3(a), the alkylphosphonotioic acid member selected from the group consisting of as set forth in Example 2(b) and collecting the eluate comprising the anticholinesterase active fractions in accordance with the following general formula

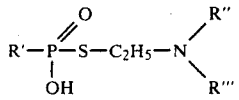

wherein

R′ is methyl, ethyl, propyl, isopropyl or butyl

R″ and R‴ are the same or different and each is methyl, ethyl or isopropyl.

Compound A is S-(2-diisopropylaminoethyl)methyl phosphonothioic acid, compound of this invention, lethal dose is 18.3 μg/Kg and the Standard is S-(diisopropylaminoethyl)ethoxy methyl phosphonothioate, lethal dose 10.8 μg/Kg, in all the following tables 1 through 4.

TABLE 1

| Source of Enzyme | Biomolecular Rate Constant $Mol^{-1}$ $min^{-1}$ 25 C. COMPOUND A | STANDARD |
|---|---|---|
| Eel acetylcholinesterase | $9.4 \times 10^5$ | $2.2 \times 10^7$ |
| Human red cell cholinesterase | $4.7 \times 10^5$ | $1.7 \times 10^7$ |

The data in Table 1, above, indicates that Compound A within the class of compounds of the instant invention has a 1 to 2 order of rate combination with the enzyme less as compared with the Standard. The method described by H. O. Michel, Medical Laboratories Research Report 183, entitled "The Reaction of Fluorophosphonate and Pyrophosphonate Agents with Enzymes", April 1953, was followed with exception that trishydroxy methylaminoethane buffer was substituted for the phosphate and Veronal buffers.

The pharmacological evaluation of the compounds of this invention for potency was determined by administering intravenously and orally in various portions having a ratio of 1.26 between the successive lethal doses. The animals, rats, were fasted about 18 hours before oral injection. $LD_{50}$ is the lowest dose in milligrams of compound per kilo-gram of animal to be lethal in 50 percent of the tested animals. Ninety-five percent confidence limits (P=0.05) and the mortality tables were estimated in accordance with C. S. Weil, *Biometric*, 8, 249 (1952). The calculations by the method of W. R. Thompson, *Bacteriol Rev* 11, 11 S (1947) were employed in determining the moving averages coupled the aforesaid Weil's mortality tables.

TABLE 2

| Route of Administration | Animals, Rats $LD_{50}$ (P = 0.05) COMPOUND A | STANDARD |
|---|---|---|
| Oral | 631.0 (514–775) | 178.0 (133–238) |
| Intravenous | 18.3 (16.6–20.9) | 10.8 (10.0–11.7) |

It was of interest to compare the resultant toxicity, Tables 3 and 4 below, of Compound A and the Standard, previously defined, utilizing the recognized treatment aids with either Compound C, atropine, or Compound D, 1,1′-trimethylenebis-(4-formylpyridinium bromide) dioxime and the combination of the said treatment aids which are effective for other organophosphorus compounds. The symptons designated as slight or moderate were ataxia, weakness, salivation and fasciculations and severe were apnea, convolutions and prostration.

TABLE 3

Compound A, Intravenously Treated Rats

| Tests | Compound A No. Lethal Doses | Treatment* | Survival Ratio** |
|---|---|---|---|
| 1 | 1.1 | Compound C following symptoms | 0:6 |
| 2 | 1.1 | Compound D following symptoms | 1:6 |
| 3 | 2.0 | Compounds C and D 2 minutes before administration of Compound A | 1:6 |
| 4 | 2.0 | As in Test 3; then repeated after 90-minute interval | 1:6 |
| 5 | 2.0 | Compounds C and D following symptoms | 1:6 |

*Treatment:
Compound C (18 mg/Kg),
Compound D (25 mg/Kg) and combinations thereof, intramuscularly applied
**Survival Ratio: Zero to one animal survived with the treatment.

TABLE 4

Compound, Standard, Intravenously Treated Rat

| Test | Standard (Poisoning) No. Lethal Doses | Interval Between Protective Treatment and Poisoning (Minutes) | Treatment | Survival Ratio** |
|---|---|---|---|---|
| 1 | 2.0 | | None, Severe Symptoms | 0:2 |
| 2 | 2.0 | 5 | Yes, following slight or moderate symptoms | 2:2 |
| 3 | 2.0 | 10 | Same as Test 2 | 2:2 |
| 4 | 2.0 | 20 | Same as Test 2 | 2:2 |
| 5 | 2.0 | 80 | Same as Test 2 | 2:2 |
| 6 | 2.0 | 120 | Yes, following severe symptoms | 4:4 |
| 7 | 2.0 | 140 | Same as Test 6 | 4:4 |

*Treatment: Compound C (4 mg/Kg) and Compound D (25 mg/Kg) intramuscularly applied.
**Survival Ratio: All animals survived with treatment.

Table 3 illustrates the ineffectiveness of the two treatment aids, Compounds C and D, against a modest challenge by the Compound S-(2-diisopropylaminoethyl)-methyl phosphonothioic and within the broad class of compounds of this invention.

Table 4 dramatically demonstrates the protection of the aforesaid treatments against the Standard, S-(diisopropylaminoethyl) ethoxy methyl phosphonothioate.

It may be interpreted from the data in Tables 3 and 4 that compounds of this invention of high toxicity would resist the treatment effective for other organophosphorus compounds where a hydroxy group replaces an alkoxy group giving rise to the unexpected results of a lethal agent.

We claim:

1. The method of preparing a S-(2-dialkylaminoethyl) alkyl phosphonothioic acid compound possessing anticholinesterase activity comprising contacting a dialkylaminoethyl chloride with an aqueous medium forming a dialkylmonoethyl ammonium ion, reacting the latter ion with an alkylphosphonothioic acid, thereby forming a reaction mixture in the aqueous medium, adjusting the pH of the aqueous medium containing the reaction mixture to pH 5 to 7 to form S-(2-dialkylaminoethyl) alkyl phosphonothioic acid in solution, placing the solution containing the S-(2-dialkylaminoethyl) alkyl phosphonothioic acid upon a cation ion-exchange resin in hydrogen form, adding an eluting agent to the ion-exchange resin and collecting the compound possessing anticholinesterase activity.

2. The method according to claim 1, wherein the aqueous medium containing the dialkylaminoethyl chloride is adjusted to a pH of 9 to 11 with an aqueous alkaline solution of potassium hydroxide or sodium hydroxide forming the dialkylmonoethyl ammonium ion.

3. The method according to claim 1, wherein the eluting agent is water and the eluate containing the compound possessing anticholinesterase activity is collected.

4. The method according to claim 3, further comprising separating the water in the eluate from the compound possessing anticholinesterase activity forming an undissolved residue, contacting said residue with chloroform and recrystallizing from a binary solvent of chloroform-ether and collecting the compound possessing anticholinesterase activity.

5. The method according to claim 1, wherein the alkyl radicals in said dialkylaminoethyl chloride have from one to three carbon atoms.

6. The method according to claim 1 wherein the alkyl radical in said alkylphosphonothioic acid has from one to four carbon atoms.

7. The method of preparing a S-(2-dialkylaminoethyl) alkyl phosphonothioic acid compound possessing anticholinesterase activity comprising contacting a dialkylaminoethyl chloride with an aqueous medium forming a dialkylmonoethyl ammonium ion, reacting the latter ion with an alkylphosphonothioic acid, thereby forming a reaction mixture in the aqueous medium, adjusting the pH of the aqueous medium containing the reaction mixture to pH 5 to 7 to form S-(2-dialkylaminoethyl) alkyl phosphonothioic acid in solution, and recovering the compound possessing anticholinesterase activity from said solution.

* * * * *